US009452338B1

(12) United States Patent
Nickles, Jr. et al.

(10) Patent No.: US 9,452,338 B1
(45) Date of Patent: Sep. 27, 2016

(54) GOLF SWING HEAD MOVEMENT DETECTION SYSTEM

(71) Applicant: Leg Up Industries LLC, Phoenix, AZ (US)

(72) Inventors: James T. Nickles, Jr., Phoenix, AZ (US); James T. Nickles, Sr., Green Valley, AZ (US); Frank D. Roberts, II, Littleton, CO (US)

(*) Notice: Subject to any disclaimer, the term of this patent is extended or adjusted under 35 U.S.C. 154(b) by 0 days.

(21) Appl. No.: 14/985,177

(22) Filed: Dec. 30, 2015

Related U.S. Application Data

(60) Provisional application No. 62/124,713, filed on Dec. 31, 2014.

(51) Int. Cl.
*A63B 69/36* (2006.01)
*A63B 24/00* (2006.01)

(52) U.S. Cl.
CPC ....... *A63B 69/3608* (2013.01); *A63B 24/0003* (2013.01); *A63B 2208/0204* (2013.01); *A63B 2220/40* (2013.01); *A63B 2220/836* (2013.01)

(58) Field of Classification Search
USPC ........ 473/207, 209, 212, 215, 219, 221, 223
See application file for complete search history.

(56) References Cited

U.S. PATENT DOCUMENTS

| | | | | |
|---|---|---|---|---|
| 5,592,401 A | * | 1/1997 | Kramer | A63B 69/3608 340/524 |
| 6,590,536 B1 | * | 7/2003 | Walton | A63B 71/0622 342/463 |
| 7,383,728 B2 | * | 6/2008 | Noble | A61B 5/1116 600/595 |
| 2003/0163287 A1 | * | 8/2003 | Vock | A43B 3/0005 702/187 |
| 2005/0288119 A1 | * | 12/2005 | Wang | A63B 69/36 473/223 |
| 2006/0199659 A1 | * | 9/2006 | Caldwell | A63B 69/3608 473/221 |
| 2013/0324274 A1 | * | 12/2013 | Stites | G09B 19/0038 473/209 |

* cited by examiner

*Primary Examiner* — Nini Legesse
(74) *Attorney, Agent, or Firm* — Thomas W. Galvani, P.C.; Thomas W. Galvani

(57) ABSTRACT

A system and method of detecting head movement during a golf swing includes wirelessly coupled sensor devices at the golfer's head and hand, each including an accelerometer, processor, and communication module. The hand sensor device measures forces at the hand, and the head sensor device measures movement at the head. During a swing, the accelerometer in the hand sensor device measures forces in three directions and generates swing data. The processor in the hand sensor device detects an impact time in the swing data, and that impact time is transmitted to the head sensor device. The accelerometer in the head sensor device continuously measures forces in three directions and generates head data. The processor in the head sensor device processes the head data around the impact time to detect head movement. The processor in the head sensor device then issues an alert if the head movement exceeds a threshold.

20 Claims, 7 Drawing Sheets

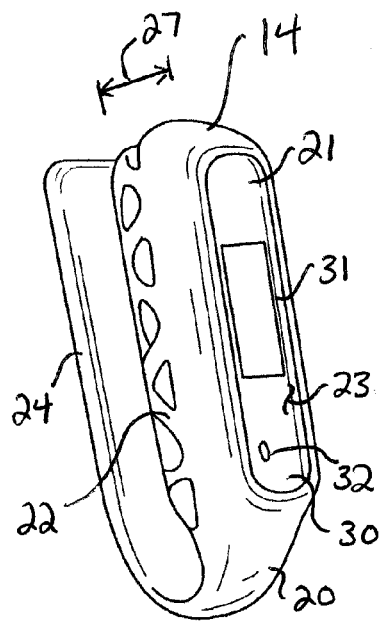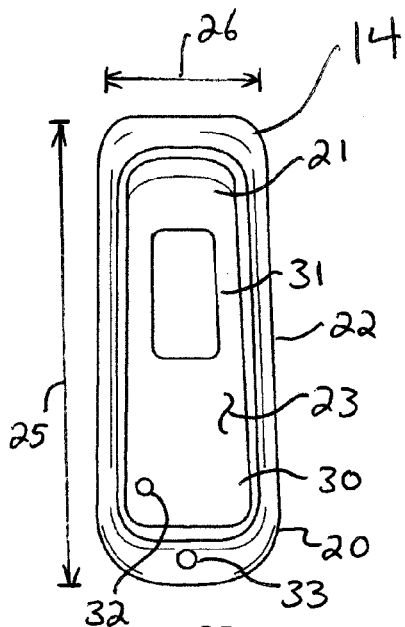
FIG. 2A    FIG. 2B
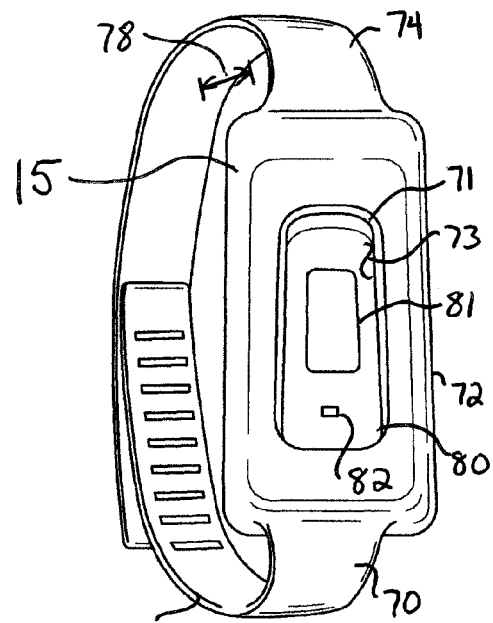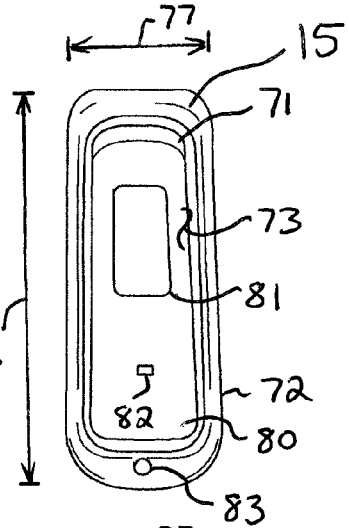
FIG. 3A    FIG. 3B

GOLF SWING HEAD MOVEMENT DETECTION SYSTEM

CROSS-REFERENCE TO RELATED APPLICATIONS

This application claims the benefit of U.S. Provisional Application No. 62/124,713, filed Dec. 31, 2014, which is hereby incorporated by reference.

FIELD OF THE INVENTION

The present invention relates generally to sporting goods, and more particularly to golf swing training equipment.

BACKGROUND OF THE INVENTION

Golfers have a tremendous number of things to pay attention to while golfing. From aligning a shot, to addressing the ball, swinging a club, gently tapping a putt, navigating a rise, and chipping or pitching a shot with the correct angle and speed, and on, the sport requires an immense degree of concentration on a great many number of essentially contemporaneous tasks. To focus on several of these things at once is difficult, and to practice all of them with enough frequency that they become learned or ingrained as muscle memory is even more difficult.

Consequently, a huge number and variety of training aids have been developed to assist golfers in developing and playing their game. Some trainings aids focus exclusively on putting the ball, some focus even more exclusively on putting the ball straight or along a curve. Some reinforce a proper technique for holding a club. Some reinforce a particular stance to address the ball before a hit. Some aids target the backswing, others target the follow-through. In other words, there is no shortage of training aids for golfers to improve one problem at a time, or many problems at once.

One recognized characteristic of professional golfers is their ability to maintain head position during a swing. The ability to hold a head position during a swing and keep a "head-down orientation," in which the golfer's eyes are kept on the ball, allows the golfer to ensure good and desired contact between the head of the club and the ball. It is the inclination of many amateur golfers, however, to watch the head of their club hit the ball and then follow the trajectory of the ball as it speeds away from a club strike. Most golfers bring their heads up too soon, or even before the club impacts the ball. This is somewhat understandable: It is a natural desire to watch the progress and pitch, the distance and direction of one's shots, and further, in other sports, following the ball with the eyes is encouraged. However, the best golfers in the world keep their head down through a shot, not looking up at the flight of the ball until well after the ball has been hit.

Despite the recognition that keeping one's head down during a shot is a critical characteristic of a good swing, there lacks an effective mechanism for training such behavior. In fact, until the advent of high-speed, fast-shutter cameras, it was incredibly difficult to even tell if a player had kept his or her head down during a shot. High-speed cameras helped only so much: they were limited in that they provided only delayed feedback, requiring video footage to be recorded, accessed, and replayed somewhere—usually not on a live golf course, making real-world practice impossible. A golf swing occurs with such speed that it is nearly impossible for one to tell whether he or she moved his head away from the ball around the moment of impact. And training aids for maintaining head position are equally ineffective, as such aids can be cumbersome and restrictive to wear, and do not reinforce good movement, but rather fix a person in a certain, likely unnatural, position or limit their range of motion. An improved device for monitoring head movement during a golf swing and providing instant feedback, heretofore unmet, is needed.

SUMMARY OF THE INVENTION

In an embodiment, a head movement detection system detects an impact—or a virtual impact—of a club with a ball, based on forces exerted at a hand sensor. The hand sensor monitors for forces above a threshold and identifies an impact time corresponding to impact over that threshold. The hand sensor then transmits the impact time to a head sensor, which continually monitors and records head movement. The head sensor, upon receiving the impact time, searches its recorded head movement and determines whether any head movement around the impact time exceeds that allowed by a threshold. If so, the head sensor immediately alerts the golfer that he has moved his head too much during his swing.

In an another embodiment, a method of detecting head movement during a golf swing includes the steps of providing first and second separated sensor devices, each including an accelerometer, a processor, and a communication module. During a golf swing, the accelerometer in the second sensor device measures forces in three orthogonal directions and generates swing data in response thereto. The processor in the second sensor device detects an impact time in the swing data. The accelerometer in the first sensor device measures forces in three orthogonal directions and generates head data in response thereto. The processor in the first sensor device processes the head data around the impact time to detect head movement. The processor in the first sensor device issues an alert in response to the head movement exceeding a threshold.

In yet another embodiment, a head movement detection system includes paired first and second sensor devices coupled in wireless communication. The first and second sensor devices each include an accelerometer, a processor, and a communication module. The accelerometer in the second sensor device is configured to record a swing motion and, in response thereto, generate swing data corresponding to the swing motion. The processor in the second sensor device is configured to process the swing data and determine an impact time in the swing motion. The accelerometer in the first sensor device is configured to record head movement and, in response thereto, generate head data corresponding to the head movement. The processor in the first sensor device is configured to, in response to the communication module in the first sensor device receiving the impact time from the communication module in the second device, determine the head movement at the impact time from the head data. The processor in the first sensor device is configured to issue an alert in response to the head movement around the impact time exceeding a threshold.

BRIEF DESCRIPTION OF THE DRAWINGS

Referring to the drawings:

FIG. 2A is a side perspective view of the head unit of FIG. 1;

FIG. 2B is a front view of a sensor device carried in the head unit of FIG. 2A;

FIG. 3A is a side perspective view of the hand unit of FIG. 1;

FIG. 3B is a front view of a sensor device carried in the hand unit of FIG. 3A;

DETAILED DESCRIPTION

Figure 1:
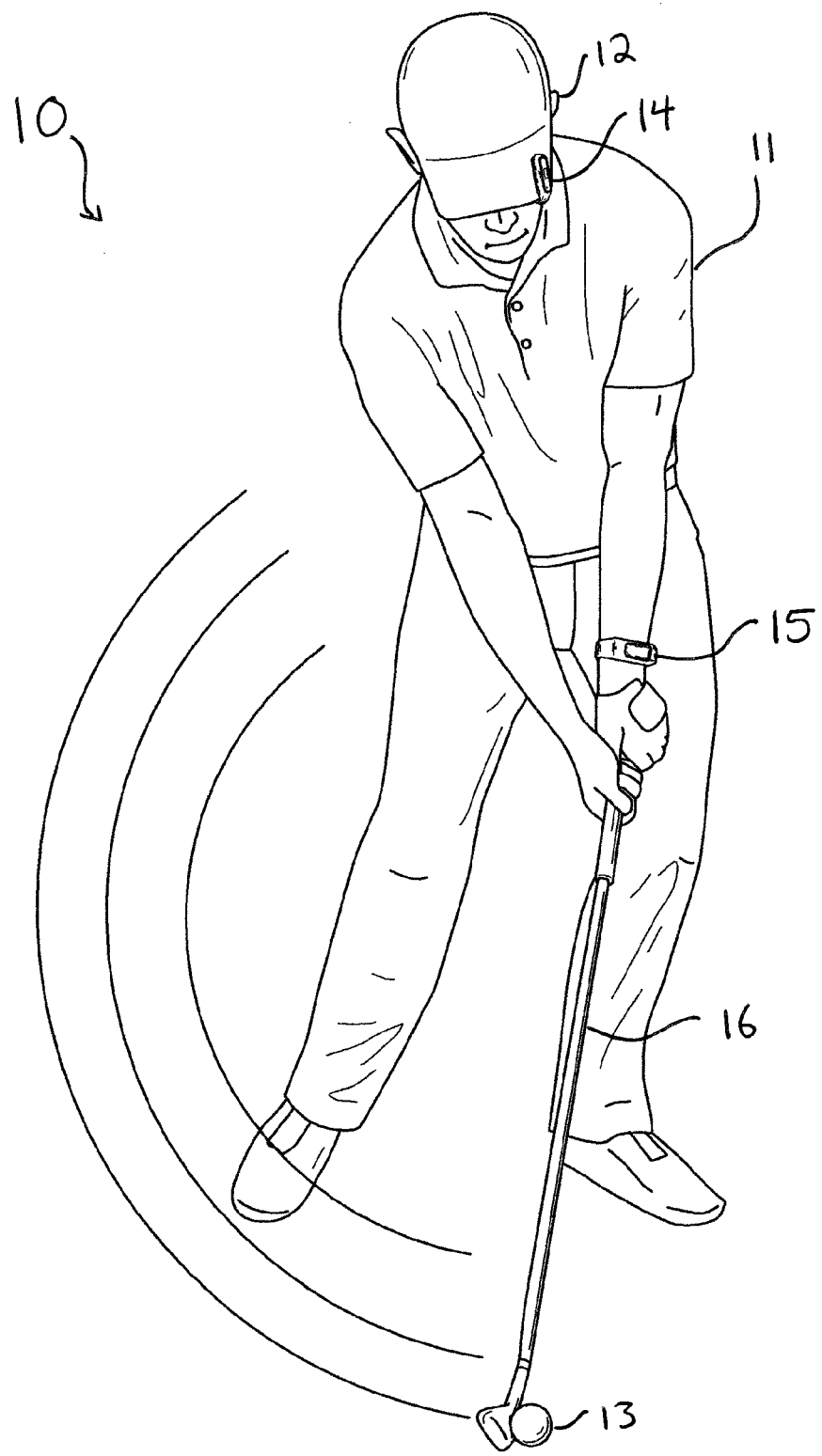
FIG. 1 is a perspective view of a golfer using a golf swing head movement detection system including a head unit and a hand unit.

Reference now is made to the drawings, in which the same reference characters are used throughout the different figures to designate the same elements. FIG. 1 is a side perspective view of a golfer 11, who will be referred to throughout this description as a male, wearing and using a golf swing head movement detection system 10. The system 10 is useful for teaching and reinforcing a head-down orientation to be adopted by the golfer, as correctly shown in FIG. 1. The "head-down orientation" refers to the alignment of the golfer's head 12 with the golf ball 13 about to struck, so that the golfer 11 keeps his eyes on the ball 13 during the entirety of the swing.

The system 10 includes a head unit 14 and a hand unit 15. The head unit 14 and hand unit 15 are constructed identically (excepted as otherwise noted herein), but programmed differently, and so each will be described in detail herein for purposes of thoroughness or the discussion and for enablement. The head unit 14 is effective at monitoring head movement during a golf swing, and the hand unit 15 is effective at monitoring hand movement and forces during a golf swing. The head unit 14 thus serves as a proxy for detecting eye orientation and movement while golfing, and the hand unit 15 serves as a proxy for club action, speed, and position during the swing relative to the golf ball 13. It is noted here that, while the head unit 14 is illustrated and described as being clipped onto the bill or brim of a hat, it should be understood that the head unit 14 can be worn on other parts of other hats, or clipped onto the head in another way (such as worn in a bandana or visor), so long as the head unit 14 is applied in such a position that it is able to move with, receive, and detect movement of the head 12. Similarly, while the hand unit 15 is illustrated and described as being worn about the wrist like a watch or wristband, it should also be understood that the hand unit 15 can be mounted anywhere near the hand, such as applied directly or indirectly to the glove, as a cap to the golf club, or in some other similar fashion that places the head unit 14 proximate to the hand and a club 16.

Reference is now made to FIGS. 2A and 2B, which illustrate an enlarged side perspective of the head unit 14 and a front view of a sensor device 21 of the head unit 14, respectively. The head unit 14 includes a housing 20 in the form of a clip which contains, holds, and secures the sensor device 21. The housing 20 has a hold 22 formed with a window 23. A sprung U-shaped arm 24 extends from the hold 22 and cooperates with the hold 22 to define the housing as a U-shaped clip suitable for attaching to an item such as the brim of a hat. The hold 22 is generally rectangular prismatic and oblong. The hold 22 has a major length 25 which is greater than a minor width 26 and a minor depth 27. The window 23 of the housing 20 is open and does not have an element disposed across or in it; however, in other embodiments, the window 23 includes a transparent member, such as a thin film, or thin piece of plastic, which extends across the window 23 and provides the ability for a user to view and observe the sensor device 21 below the window 23. The housing 20 itself is constructed from a molded plastic, such as rubber, and has material characteristics of durability, water impermeability, resiliency, and compressibility. The compressibility characteristic allows a golfer to depress a push button 33 near the bottom of the sensor device 21 to activate and deactivate the sensor device 21 (as is described below) by squeezing or depressing the housing 20 disposed directly above the button 33. In other embodiments, the push button 33 is located in another location, such as the side of the sensor device 21, without material effect on the operation of the sensor device 21.

The sensor unit 21 carried within the housing 20 includes a rugged, durable, rigid case 30 containing electronic and piezo-electric components. The sensor unit 21 includes an electronic display 31 formed in the case 30. The electronic display 31 displays information about the control and operation of the sensor unit 21, such as on/off information, menu information, operational status information, and the like. The display 31 is an LCD display, and in other embodiments is an LED, OLED, or similar display. A light 32, in the form of an LED, is also carried in the case 30, proximate to the electronic display 31. The light 32 produces various colors in response to a signal from the electronic components within the case 30, as will be explained. The electronic display 31 and light 32 are carried on the same planar face on the same side of the case 30, as FIGS. 2A and 2B both clearly show.

Figure 4A:
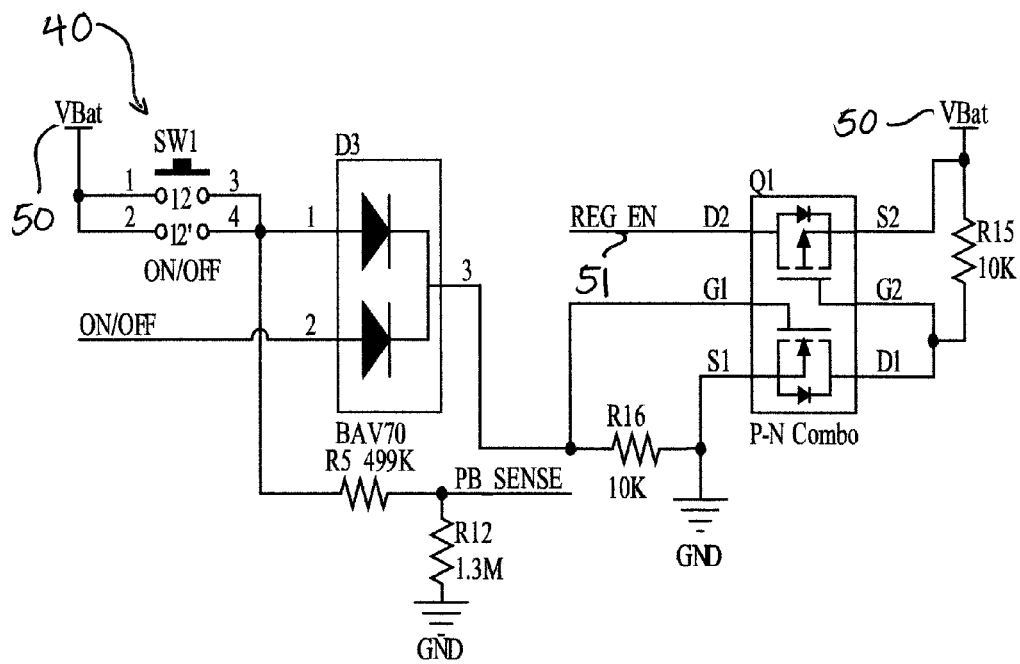
FIGS. 4A, 4B, and 4C are generalized electrical schematics of the head and hand units of FIG. 1.
Figure 4A:
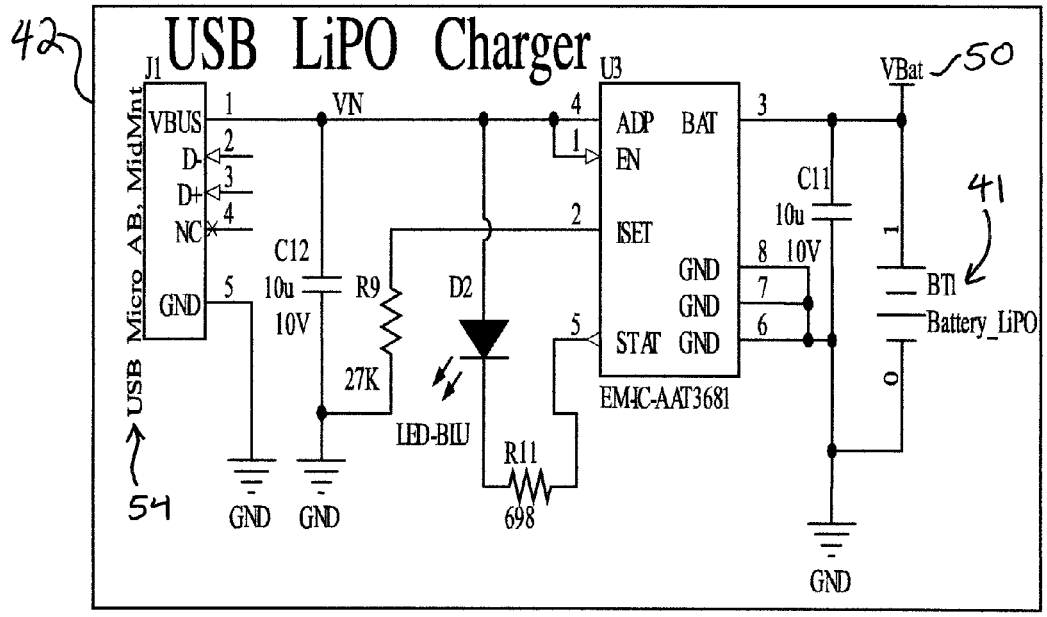
Figure 4B:
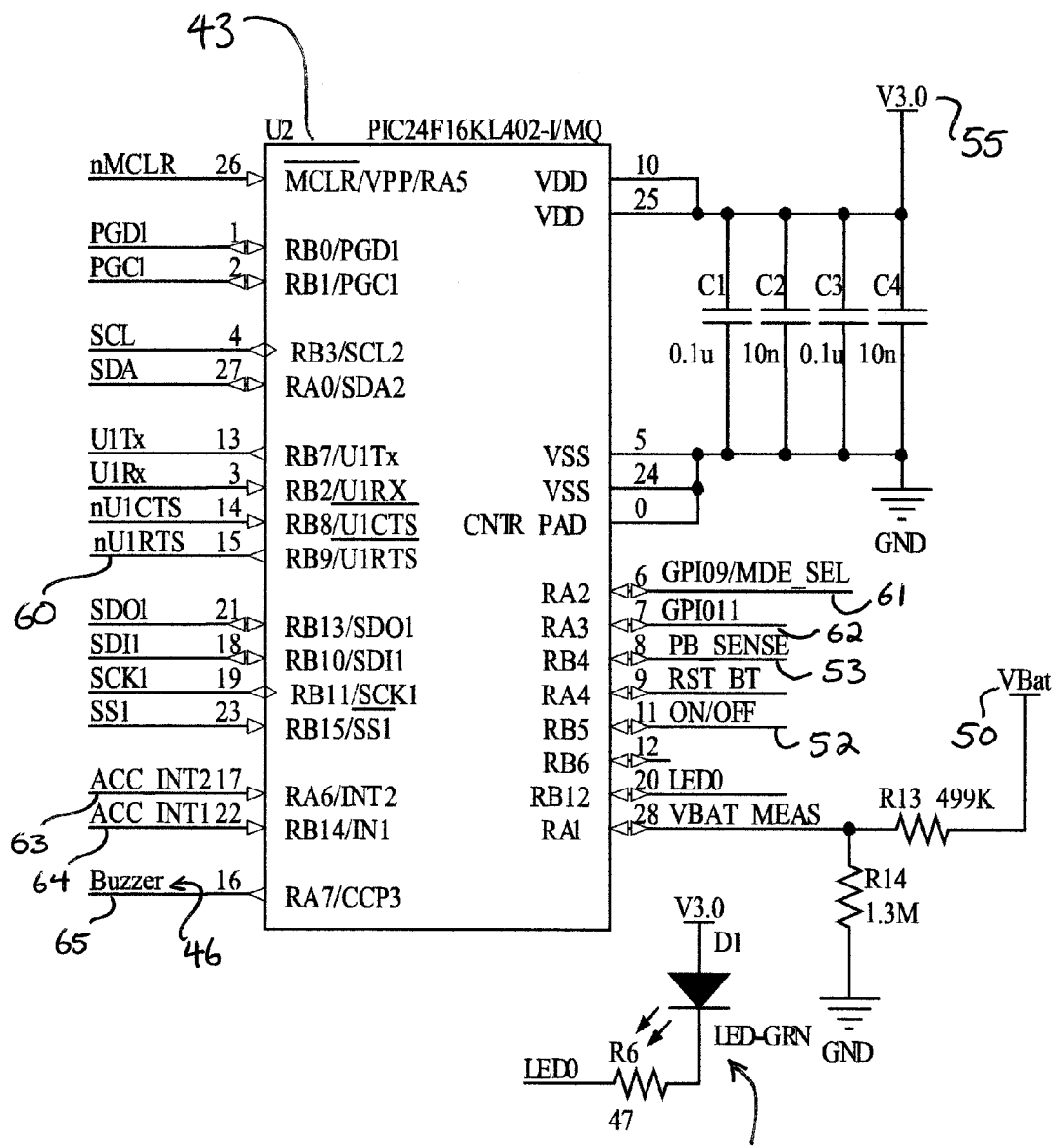
Figure 4C:
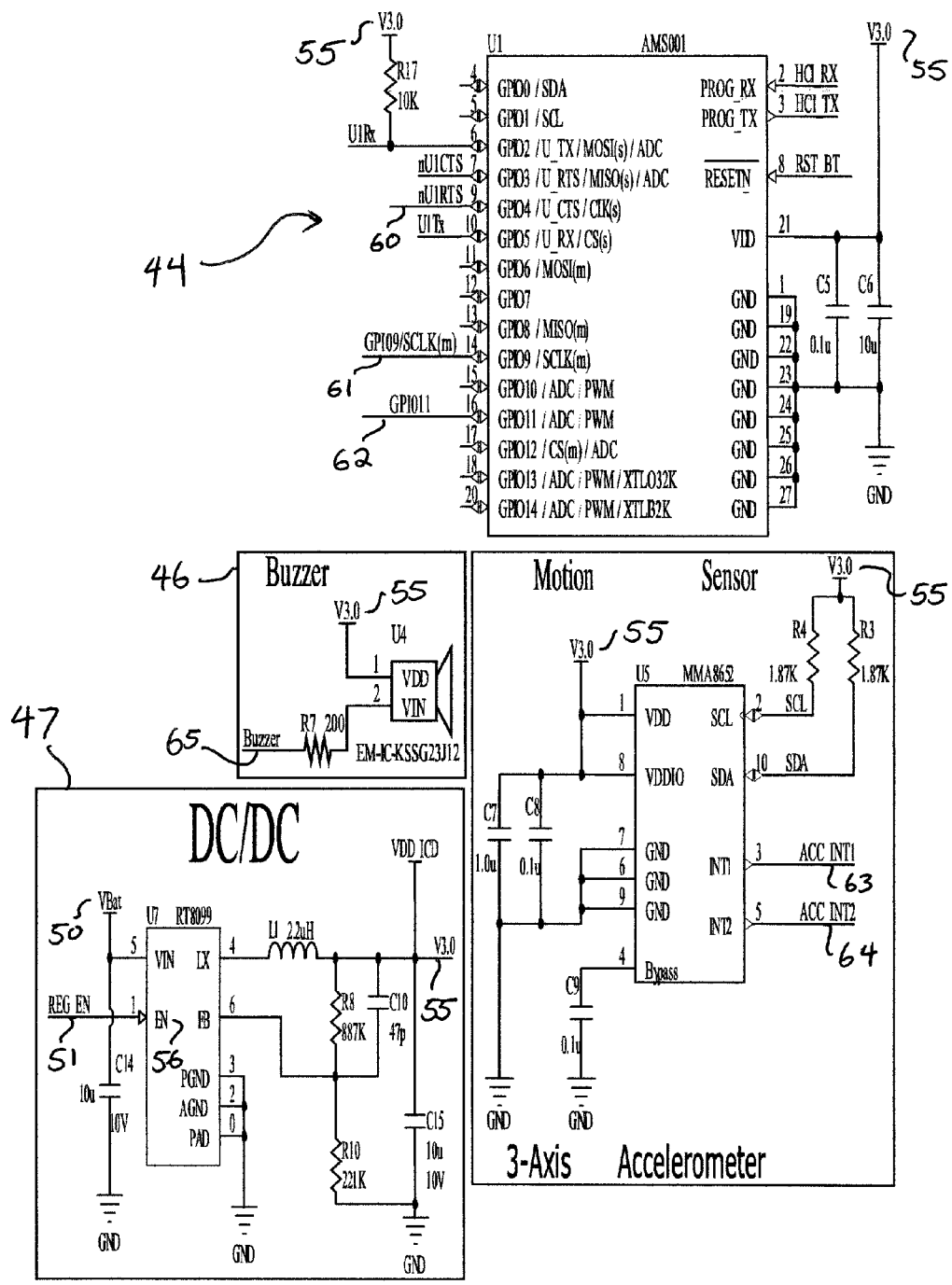

FIGS. 4A-4C are generalized electrical schematics illustrating the various electronic components contained within the case 30. Within the case 30 is a switch 40, a battery 41, a battery charger 42, a microcontroller 43, a communication module 44, an accelerometer 45, a buzzer 46, and a voltage converter 47.

The switch 40 is electronically coupled to a push button 33, or other similar device, allowing the golfer to turn the sensor device 21 on and off. The switch 40 is located under the push button 33 concealed by the housing 20. The switch 40, when activated, energizes the microcontroller 43, communication module 44, and accelerometer 45. To energize the sensor device 21, the golfer depresses the push button 33 for approximately three seconds to activate the switch 40 to the ON position. The switch 40 is connected to the battery 41, which provides a battery voltage 50. When the switch 40 is activated to the ON position, transistors in the switch 40 transmit a high signal to the REG_EN line 51, which, as seen in FIG. 4C, is connected to the voltage converter 47. The voltage converter 47 is enabled, and the microcontroller 43 drives the ON/OFF line 52 high. The microcontroller 43 continually thereafter monitors the PB_SENSE line 53, and in response to the PB_SENSE line 53 going high, times how long the PB_SENSE line 53 is high. If the PB_SENSE line 53 is high for three continuous seconds, the microcontroller 43 drops the ON/OFF line 52 to low, thereby turning the transistors of the switch 40 off, which then drops the REG_EN line 51 to low, so that the voltage converter 47 turns off the entire sensor device 21.

When the switch 40 has been activated, and the sensor device 21 is operating, the battery 41 provides power to the sensor device 21. The battery 41 is preferably a 60 mAh capacity rechargeable, lithium-ion polymer battery, and is charged periodically via a micro-USB cable 54 connected to the battery charger 42. The voltage converter 47 is coupled to the battery 41 to provide regulated DC voltage from the battery 41 to the rest of the sensor device 21. The voltage converter 47 is a 2 MHz low quiescent current converter and provides an output voltage of 3 volts along voltage line 55. The voltage converter 47 is enabled when the REG_EN line 51, coupled to an ENABLE pin 56, is high. Once enabled, the voltage converter 47 provides regulated power at 3 volts to the sensor device 21 along the voltage line 55.

Once the sensor device 21 is energized and operating, the microcontroller 43 controls operations of the sensor device 21. The microcontroller 43 is coupled to the accelerometer 45 to read the data recorded and generated by the accelerometer 45. The microcontroller 43 is similarly coupled to the communication module 44 to transmit data, information, and instructions to the communication module 44 to issue a wireless signal to an external device containing the data and information. The microcontroller 43 is coupled to the switch 40 to detect when the push button 33 is depressed for three seconds and the sensor device 21 is to be turned off. The microcontroller 43 is coupled to both the light 32 and the buzzer 46 to control their operation. Finally, the microcontroller is coupled to the battery 41 to monitor the battery voltage 50 for drops and irregularities, and to detect when the battery 41 needs to be charged. The microcontroller 43 includes a processor, a clock, and a non-volatile, non-transitory memory storage medium, such as flash memory, SRAM, or like static memory. The memory storage medium is pre-loaded permanently with software for operating the sensor device 21, and the microcontroller 43 in the head unit 14 runs this software specifically for the head unit 14. Thus, the microcontroller 43 is special-purpose, as it is pre-programmed and configured to run a special-purpose software and set of operating instructions on the head unit 14.

The communication module 44 is preferably a Bluetooth module, and is programmed to automatically pair with the communication module in the hand unit 15, which is also preferably a Bluetooth module. When the two communication modules 44 in each of the head and hand units 14 and 15 find each other, they automatically pair. The communication module 44 has two modes of operation: a command mode and a stream mode. When in the command mode, the communication module 44 receives instructions from the microcontroller 43 so as to configure the various pins of the communication module, such as the general purpose input/output ("GPIO") pins. On the other hand, when in the stream mode, the communication module 44 operates as a wireless universal asynchronous receiver/transmitter, so that the other communication module 44—or any paired Bluetooth device—will receive data sent from the communication module 44, and conversely, can send data to the communication module 44 for reception by it and then processing by the microcontroller 43.

The communication module 44 is programmed so that certain pins have dedicated functions. Pin GPIO4 is coupled to a nU1RTS line 60, which is coupled to the microcontroller 43, to detect whether the communicate module 44 has connected and paired to another Bluetooth device, such as the hand unit 15. Pin GPIO9 is coupled to a GPIO9/MODE_SEL line 61, which is coupled to the microcontroller 43, to inform the microcontroller 43 which mode the communication module 44 is currently operating in, command mode or stream mode. Pin GPIO11 is coupled to a GPIO11 line 62, which is coupled to the microcontroller 43 to inform the microcontroller 43 that the communication module 44 has entered the stream mode.

The accelerometer 45 is a three-axis, 12-bit, 8G accelerometer. The accelerometer 45 has two output lines, ACC_INT1 line 63 and ACC_INT2 line 64, which are coupled to the microcontroller 43 to provide data to the microcontroller 43 for reading and processing. The accelerometer 45 in the head unit 21 is software governed to a 2G maximum. This reduced setting allows the accelerometer 45 to detect more subtle movements as are more typical of the head than the hand. It has a 12-bit resolution, and samples at 50 hertz. The sampling rate is reduced in comparison with the accelerometer 45 of the hand unit 15 because head movements are slower than hand movements, and because it reduces the buffer size and thus allows more information to be loaded at once into the memory on the microcontroller 43.

The sensor device 21 also includes the light 32 and the buzzer 46. The light 32 is shown schematically in FIG. 4B coupled to the microcontroller 43. The microcontroller 43 changes the color, pulse, and duration of the light 32 depending on the operational status of the sensor device 21. The light 32, which again is preferably a tunable, or color-changing, LED, illuminates with a blue light when the sensor device 21 is charging via the micro-USB cable 54. The light 32 stops illuminating as blue when the battery 41 is fully charged. The light 32 illuminates with a green light to indicate the pairing status of the head and hand units 14 and 15. When the head and hand units 14 and 15 are not paired, the light 32 emits a single green flash every five seconds, which indicates that the head and hand units 14 and 15 are operating properly but have not yet been paired. When the head and hand units 14 and 15 are paired, the light 32 emits two green flashes every five seconds, which indicates the head and hand units 14 and 15 are ready for use. When the sensor device 21 is on, and the switch 40 is depressed for three seconds, the sensor device 21 will deactivate. The light 32 however, will emit a solid green light until the button 33 is released. The light 32 also emits a light when the head unit 14 is moved prematurely, as will be explained.

The buzzer 46, illustrated in FIG. 4C, is a piezo-electric buzzer coupled to the voltage line 55 and to a BUZZER line 65, which is connected to the microcontroller 43. The buzzer 46 is driven by the microcontroller 43, but in other embodiments, a transistor is disposed between the microcontroller 43 and the buzzer 46 to amplify the power and variety of tones that the buzzer 46 produces. When the sensor device 21 is activated, the buzzer 46 produces three identical sets of ascending tones. Conversely, when the sensor device 21 is de-activated, the buzzer 46 produces three identical sets of descending tones. The buzzer 46 also produces a noise—an alarm or alert—five times in a row when the head unit 14 is moved prematurely, as will be explained.

As discussed above, the head unit 14 and the hand unit 15 are constructed very similarly. Discussion of the hand unit 15 will now be made, with reference to FIGS. 3A and 3B, which include an enlarged side perspective of the hand unit 15 and a front view of a sensor device 71 of the hand unit 15, respectively. The hand unit 15 includes a housing 70 in the form of a wristband which contains, holds, and secures the sensor device 71. The housing 70 has a hold 72 formed with a window 73. Two opposed wristband arms 74 and 75 extend from the hold 72 and cooperate with the hold 72 to define the housing 70 as a wristband suitable for attaching to the golfer's arm or wrist. The hold 72 is generally rectangular prismatic and oblong. The hold 72 has a major length 76 which is greater than a minor width 77 and a minor depth 78. The window 73 of the housing 70 is open and does not have an element disposed over, extending across, or carried in it; however, in other embodiments, the window 73 includes a transparent member, such as a thin film, or thin piece of plastic, which extends across the window 73 and provides the ability for a user to view and observe the sensor device 71 below the window 73. The housing 70 itself is constructed from a molded plastic, such as rubber, and has material characteristics of durability, water impermeability, resiliency, and compressibility. The compressibility characteristic allows a golfer to depress a push button 83 at the bottom of the sensor device 71 (as is described below) by squeezing or depressing the housing 70 disposed above the push button 83. In other embodiments, the push button 83 is located in another location, such as the side of the sensor device 71, without material effect on the operation of the sensor device 71.

The sensor unit 71 carried within the housing 70 includes a rugged, durable, rigid case 80 containing the electronic and piezo-electric components. The sensor unit 71 includes an electronic display 81 mounted in the case 80. The case 80 is slightly different from the case 30 of the head unit 14, so as to illustrate an alternate embodiment of the case. The electronic display 81 displays information about the control and operation of the sensor unit 71, such as on/off information, menu information, operational status information, and the like. The display 81 is an LCD display, and in other embodiments is an LED, OLED, or other similar display. A light 82, in the form of an LED, is also carried in the case 80, proximate to the electronic display 81. The light 82 produces various colors in response to a signal from the electronic components within the case 80, as will be explained. The electronic display 81 and light 82 are carried on the same planar face on the same side of the case 80, as FIGS. 3A and 3B both clearly show.

With the case 80, the hand unit 15 carries nearly identical structural, electronic, and piezo-electric components as the head unit 14. As such, the description will not discuss each component in detail, but instead provides a summary of some of the components, which are identified with the same reference characters as those used to describe the same components of the head unit 14. The case 80 houses a switch 40, a battery 41, a battery charger 42, a microcontroller 43, a communication module 44, an accelerometer 45, a buzzer 46, and a voltage converter 47. The description does discuss the special programming of the head and hand units 14 and 15 which differentiates the two from each other.

The switch 40 in the hand unit 15 activates and deactivates the sensor device 81 in response to depression of the push button 83 to which the switch 40 is coupled. As with the head unit 14, the hand unit 15 activates when the push button 83 is depressed for approximately three seconds. Similarly, depression of the push button 83 for approximately three seconds while the sensor device 81 is already on will turn the sensor device 81 off.

When operating, the battery 41 in the hand unit 15 provides power to the sensor device 81. The battery 41 is preferably a 60 mAh capacity rechargeable, lithium-ion polymer battery, and is charged periodically via a micro-USB cable 54 connected to the battery charger 42. The voltage converter 47 is coupled to the battery 41 to provide regulated DC voltage from the battery 41 to the rest of the sensor device 81.

Once the sensor device 81 is energized and operating, the microcontroller 43 controls operation of the sensor device 21. The microcontroller 43 is coupled to the accelerometer 45 to read the data recorded and generated by the accelerometer 45, is coupled to the communication module 44—preferably a Bluetooth module identical to the communication module 44 in the head unit 14—to issue and receive wireless signals to and from an external device, namely, the head unit 14. The microcontroller 43 is coupled to the switch 40 to detect when the push button 83 is depressed, and is coupled to the light 32 and the buzzer 46 to control their operation. The microcontroller 43 includes a processor, a clock, and a non-transitory memory storage medium, such as flash memory, SRAM, and the like. The memory storage medium is pre-loaded permanently with software for operating the sensor device 71, and the microcontroller 43 in the hand unit 15 runs this software specifically for the hand unit 15. The software in the memory storage medium in the hand unit 15 is different from the software in the memory storage medium in the head unit 14, and instructs the hand unit 15 to operate differently from the head unit 14, and specifically for detecting an impact with a golf ball, rather than for detecting head movement. Thus, the microcontroller 43 in the hand unit 15 is special-purpose, as it is pre-programmed and configured to run software specially programmed to sense and detect movement within certain ranges on the hand unit 15, according to a set of fixed operating instructions embodied in the software on the memory storage medium.

The communication module 44 in the hand unit 15 is preferably a Bluetooth module, and is programmed to automatically pair with the communication module in the head unit 14. When the two communication modules 44 in each of the head and hand units 14 and 15 find each other, they automatically pair. The communication module 44 has two modes of operation: a command mode and a stream mode. When in the command mode, the communication module 44 receives instructions from the microcontroller 43 of the hand unit 15 so as to configure the various pins of the communication module, such as the general purpose input/output ("GPIO") pins. On the other hand, when in the stream mode, the communication module 44 operates as a wireless universal asynchronous receiver/transmitter. In the stream mode, the communication module 44 in the hand unit 15 most frequently operates to send data to the head unit 14 for reception thereby and subsequent processing by the microcontroller 43 in the head unit 14.

The accelerometer 45 in the hand unit 15 is a three-axis, 12-bit, 8G accelerometer. The accelerometer 45 has two output lines, ACC_INT1 line 63 and ACC_INT2 line 64, which are coupled to the microcontroller 43 in the hand unit 15 to provide data to the microcontroller 43 from reading and processing. The accelerometer 45 includes an on-board high-pass filter which is enabled in the hand unit 15. The high-pass filter removes unwanted data, or slow-movement portions of the swing movement, so that the lines 63 and 64 to the microcontroller 43 pass less information and allow the microcontroller 43 to focus on the faster movements typical of a golf swing. The accelerometer 45 in the hand unit 21 exploits its full capability to 8Gs, to allow the accelerometer 45 to detect the large and rapid movements of a hand during a golf swing. It has a 12-bit resolution, and samples at 100 hertz. The sampling rate is higher than that of the accelerometer 45 of the head unit 14 because hand movements are much faster than the head movements during a swing, and it is desired that the hand unit 15 record more events per unit of time than the head unit 14.

The sensor device 81 also includes the light 32 and the buzzer 46, though the buzzer 46 in the sensor device 81 is generally not used and thus may be left out in an alternate construction. The light 32 and the buzzer 46 in the hand unit 15 operate similarly as the light 32 and the buzzer 46 in the head unit 14.

In use, the system 10 is helpful for a golfer 11 to minimize his head movement during a swing. The golfer 11 picks up the head unit 14 and turns it on by depressing the push button 33 for three seconds. At about the same time, the golfer 11 picks up the hand unit 15 and turns it on by depressing the push button 83 for three seconds. The communication modules 44 on both the head and hand units 14 and 15 search, find, and automatically pair with each other. According to the software pre-loaded on the memory storage mediums of the microcontrollers 43 of both the head and hand units 14 and 15, the communication modules 44 of both the head and hand units 14 and 15 enter the stream mode, so that each is able to send and receive data and information to the other.

While the components of the head and hand units 14 and 15 are nearly identical, the special-purpose operating software pre-installed on the memory storage mediums of the microcontrollers 43 of the head and hand units 14 and 15 are different, so that the head and hand units 14 and 15 operate and respond in different ways.

In an embodiment, the software on the head unit 14 instructs the head unit to begin recording data into the memory storage medium when the head unit 14 is held steady for a short time, such as approximately 4 or 5 seconds. The head is typically held steady—and the head unit 14 is thus also typically held steady—when the golfer 11 is addressing the ball 13 and looking continuously at the ball 13. The head unit 14, instead of merely capturing the head movement, begins to record and store the head movement as head data in the memory storage medium of the head unit 14, because a swing is likely about to occur. Alternatively, in other embodiments, the head unit 14 begins to record and store head movement as head data in the memory storage medium of the head unit 14 when the hand unit 15 detects the start of a back swing. When accelerometer 45 in the hand unit 15 detects continuous motion in a first direction, away from a steady position, a back swing is detected. The microcontroller 43 sends an instruction and data to the communication module 44 in the hand unit 15 to transmit a signal to the communication module 44 in the head unit 14. The signal is received, and then processed by the microcontroller 43 in the head unit 14 to determine that the back swing has begun, and the microcontroller in the head unit 14 thus begins recording head movement information from the accelerometer 45 to the memory storage medium as head data. Approximately two seconds of head data, sampled at 50 hertz and with 12-bit resolution, is stored in the memory storage medium of the microcontroller 43 of the head unit 14. Alternatively, in a preferred embodiment, the microcontroller 43 continually records, stores, and overwrites head movement information from the accelerometer 45 of the head unit 14 into the memory storage medium of the head unit 14, maintaining approximately the most recent two seconds of head data in the memory storage medium of the head unit 14.

To record head movement as head data, the golfer 11 clips the head unit 14 onto his head 12, such as by fitting the head unit 14 onto the brim of his hat. To record golf swing motion, the golfer 11 applies the hand unit 15, such as by strapping the housing 70 carrying the sensor device 71 onto his wrist. The golfer 11 is now ready to receive information about his swing and head movement.

The hand unit 15 is specially programmed to detect two things: impact of the club 16, and a virtual impact of the club 16, such as would occur during a practice swing. The accelerometer 45 in the hand unit 15 continually records, stores, and overwrites hand movement information—or "swing motion"—from the accelerometer 45 of the hand unit 15 into the memory storage medium of the hand unit 15 as "swing data." When an impact is detected in the swing data, the hand unit 15 notifies the head unit 14 of the event.

Figure 5:
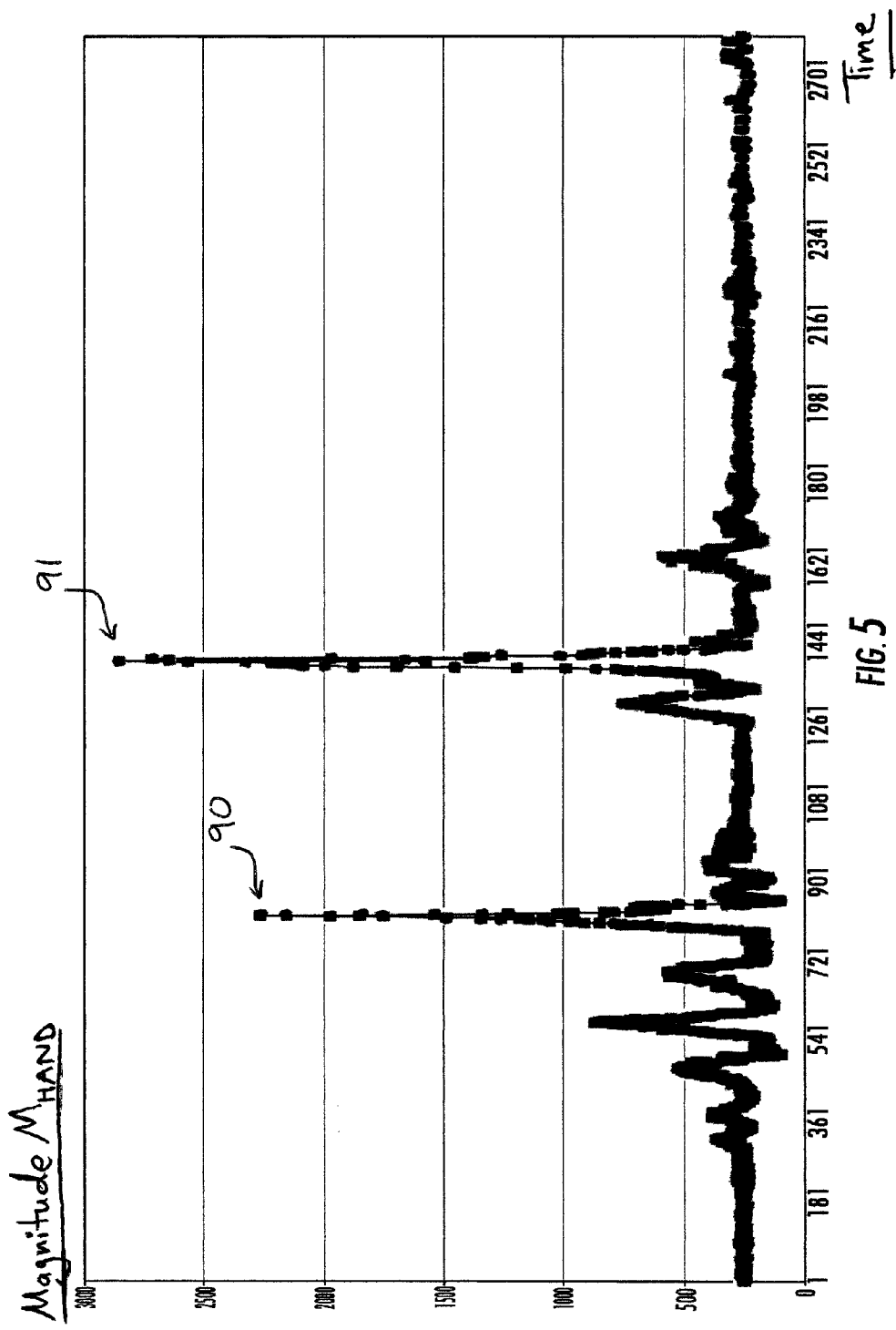
FIGS. 5 and 6 are plots showing swing data and head data from the hand and head units, respectively.

The accelerometer 45 measures forces in three dimensions and computes a combined magnitude of the three forces according to:

$$M_{HAND} = \sqrt{F_X^2 + F_Y^2 + F_Z^2} \quad (1),$$

where $M_{HAND}$ is the magnitude of the three forces during hand movement, $F_X$ is the force in the X direction, $F_Y$ is the force in the Y direction, and $F_Z$ is the force in the Z direction. Magnitude $M_{HAND}$ is then plotted against time to create a graph of the swing data over time. FIG. 5 shows an exemplary graph of swing data. FIG. 5 illustrates two peaks, identified as peak 90 and peak 91. Peak 90 corresponds to a typical practice swing, and peak 91 corresponds to a typical club impact (magnitude 2853). It is thus seen that the while the club impact does create a larger magnitude than the practice swing, it is not dramatically larger when compared to the other magnitudes of what is essentially noise created by non-swing movements of the club before and after the swing. Thus, a threshold is established, above which a magnitude reading is considered to correspond to a swing, and below which a magnitude reading is considered to correspond to non-swing noise. A threshold of approximately 2300 allows practice swings and softer swings such as pitch shots to be captured above the threshold, as well, of course, as drives. The peaks captured above the threshold are identified as impacts.

When an impact is identified, the microcontroller 43 in the hand unit 15 records the time (an "impact time") at which the impact occurred, and transmits the impact time to the communication module 44, along with an instruction to transmit the occurrence of an impact and the impact time. The communication module 44 in the hand unit 15 then transmits the occurrence of an impact and the impact time to the communication module 44 in the head unit 14. The transmitted message is very small, and as simple as transmitting a "!" character together with a timestamp for the impact. The communication module 44 in the head unit 14 receives the data, and the microcontroller 43 in the head unit 14 processes the data to determine that an impact has occurred at a certain impact time. The microcontroller 43 in the head unit 14 access its memory storage device at the impact time and analyzes the head data surrounding that impact time.

As noted above, the microcontroller 43 in the head unit 14 continually records, stores, and overwrites head movement information from the accelerometer 45 of the head unit 14 into the memory storage medium of the head unit 14, maintaining approximately the most recent two seconds of head data in the memory storage medium of the head unit 14. Head data is stored as the magnitude of three forces measured by the accelerometer 45 in the head unit 14.

Figure 6:
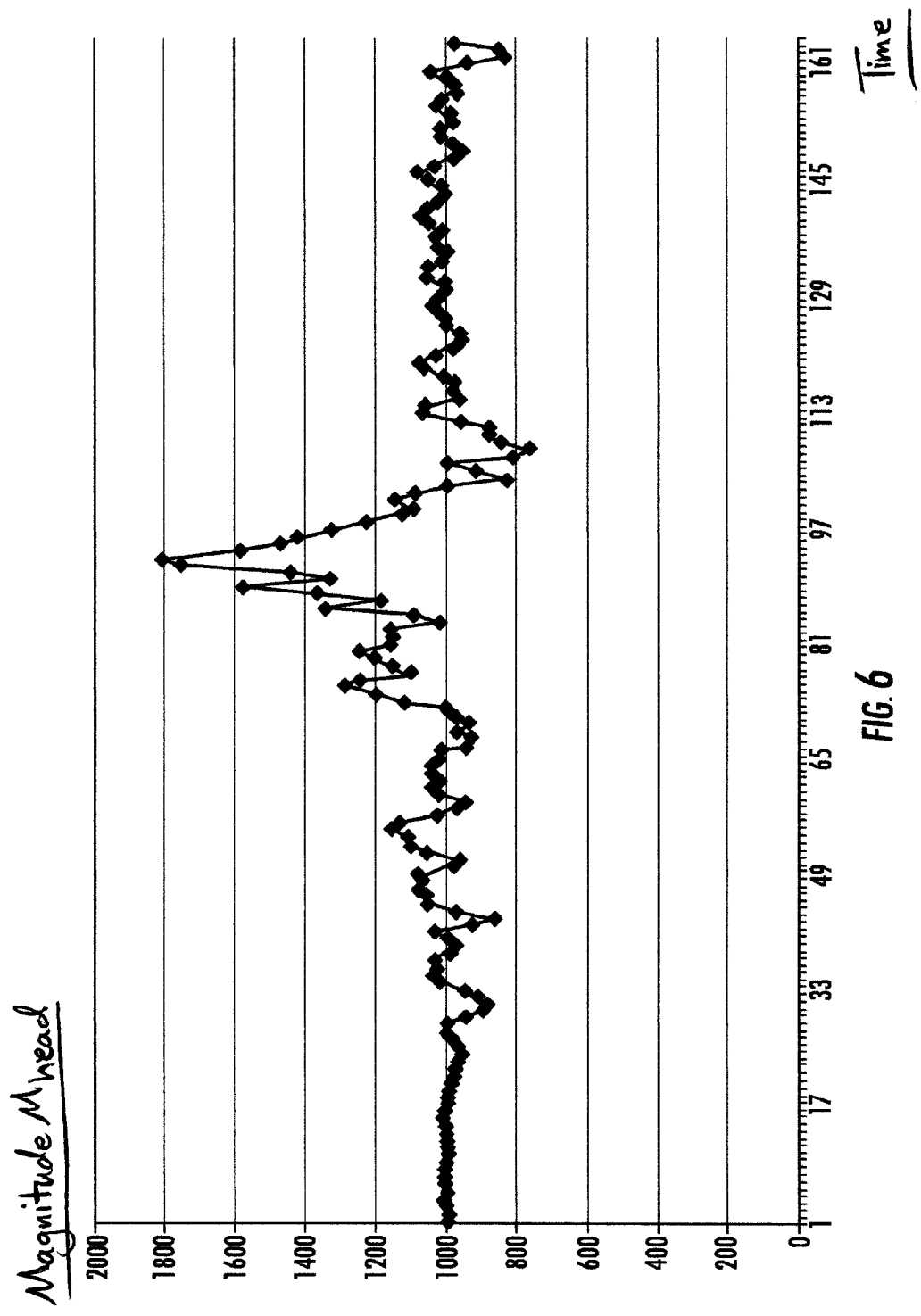

The accelerometer 45 measures forces in three dimensions and computes a magnitude of the three forces according to:

$$M_{head} = \sqrt{F_x^2 + F_y^2 + F_z^2} \quad (2),$$

where $M_{head}$ is the magnitude of the three forces during head movement, $F_x$ is the force in the X direction, $F_y$ is the force in the Y direction, and $F_z$ is the force in the Z direction. Magnitude $M_{head}$ is then plotted against time to create a graph of the head data over time. FIG. 6 shows an exemplary graph of head data. The clock of the microcontroller 43 in the head unit 14 is preferably synchronized with the clock of the microcontroller 43 in the hand unit 15, but may not always be. As FIGS. 5 and 6 illustrate, the clocks are not synchronized, because the time axes show different values. However, when the head and hand units 14 and 15 are paired, the microcontroller 43 in the head unit 14 notes the differences between the clocks of the head and hand units 14 and 15, so that it can determine the time in the head unit 14 which corresponds to a time in the hand unit 15.

A threshold level for head movement is pre-programmed into the head unit 14. Empirical studies have determined that a threshold value of 1700 is preferred. This is identified on FIG. 6 in broken line as threshold 92. In the exemplary FIGS. 5 and 6, the impact time for the peak 91 is time 1411 on the hand unit 15, which corresponds to time 92 on the head unit 14. At time 92 on FIG. 6, the magnitude is above the threshold 92 and rises even higher just after time 92 (it is noted that the times marked along the time axes in both FIGS. 5 and 6 are not seconds, but portions of seconds, because the accelerometers 45 are sampling at 50 and 100 hertz). This means that the golfer 11 moved his head too much at the impact time and just afterward. This is excessive head movement.

In response to detecting excessive head movement, the microcontroller 43 in the head unit 14 issues an alert to the golfer 11. The alert is in the form of an illumination, a noise, or both. When the microcontroller 43 in the head unit 14 detects excessive head movement—head data rising above the threshold 92 within two seconds of the impact time—the microcontroller 43 sends a signal to the buzzer 46 to energize and produce a noise, indicating to the golfer 11 immediately that he has moved his head. Further, the microcontroller 43 in some embodiments sends a signal to the light 32 to illuminate, such as with a red light, indicating to the golfer 11 immediately that he has moved his head. In this way, the golfer 11 gains immediate feedback regarding his head movement during his swing. The golfer 11 can then take a few practice swings to improve his head movement, or can move on to the next shot or hole and try again there. The head and hand units 14 and 15 are ready to detect excessive head movements again just after alerting the golfer 11 in this manner.

A preferred embodiment is fully and clearly described above so as to enable one having skill in the art to understand, make, and use the same. Those skilled in the art will recognize that modifications may be made to the described embodiment without departing from the spirit of the invention. To the extent that such modifications do not depart from the spirit of the invention, they are intended to be included within the scope thereof.

The invention claimed is:
1. A method of detecting head movement during a golf swing, the method comprising the steps of:
 providing first and second separated sensor devices, each including an accelerometer, a processor, and a communications module;
 the first sensor device is characterized as a head monitor sensor and is configured to monitor movement of a head of a golfer, and the second sensor device is characterized as a club monitor sensor and is configured to monitor movement of a golf club;
 during a golf swing, the accelerometer in the club monitor sensor device measuring forces in three orthogonal directions and generating swing data in response thereto;
 the processor in the club monitor sensor device detecting an impact time in the swing data;
 the accelerometer in the head monitor sensor device measuring forces in three orthogonal directions and generating head data in response thereto;
 the processor in the head monitor sensor device processing the head data around the impact time to detect head movement; and
 the processor in the head monitor sensor device issuing an alert in response to the head movement exceeding a threshold.

2. The method of claim 1, wherein the alert is an audible alert.

3. The method of claim 1, wherein the alert is a visual alert.

4. The method of claim 1, wherein:
 the head monitor sensor device further includes non-transitory memory; and
 further including the step of the processor in the head monitor sensor device receiving the head data and storing the head data into the non-transitory memory.

5. The method of claim 1, wherein the step of the processor in the club monitor sensor device detecting an impact time in the swing data further includes:
 the processor of the club monitor sensor device processing a combined magnitude of the forces measured by the accelerometer of the club monitor sensor device;
 the processor of the club monitor sensor device identifying an impact as a magnitude exceeding a threshold; and
 the processor of the club monitor sensor device identifying the impact time as a time corresponding to the impact.

6. A method of detecting head movement during a golf swing, the method comprising:
 providing first and second sensor devices, characterized as a head monitor sensor configured to monitor movement of a head of a golfer, and as a club monitor sensor configured to monitor movement of a golf club, respectively;
 mounting the head monitor sensor device to the head of the golfer and the club monitor sensor device proximate to a hand of the golfer;
 the golfer performing a golf swing; and
 during the golf swing:
 the head monitor sensor device detecting and recording movement of the head of the golfer;
 the club monitor sensor device detecting an impact time corresponding to a combined magnitude of forces being exerted at the club monitor sensor device;
 the club monitor sensor device transmitting the impact time to the head monitor sensor device;
 the head monitor sensor device identifying the movement of the head surrounding the impact time; and
 the head monitor sensor device issuing an alert to the golfer in response to the movement of the head surrounding the impact time exceeding a threshold.

7. The method of claim 6, wherein the alert is an audible alert.

8. The method of claim 6, wherein the alert is a visual alert.

9. The method of claim 6, wherein the head monitor and club monitor sensor devices each include an accelerometer, a processor, and a communication module.

10. The method of claim 6, wherein:
 the head monitor and club monitor sensor devices each include non-transitory memory; and
 the step of the head monitor sensor device detecting and recording movement of the head of the golfer includes:
 the accelerometer of the head monitor sensor device measuring forces on the head monitor sensor device in three directions;

the processor of the head monitor sensor device processing a combined magnitude of the forces; and the processor of the head monitor sensor device recording the magnitude of the forces into the non-transitory memory of the head monitor sensor device as head data.

11. The method of claim 10, wherein the step of the processor of the head monitor sensor device recording the magnitude of the forces includes storing two seconds of head data.

12. The method of claim 6, wherein the step of the head monitor sensor device issuing an alert to the golfer further includes issuing the alert in response to the movement of the head exceeding the threshold within two seconds of the impact time.

13. A head movement detection system comprising:

paired head monitor and club monitor sensor devices coupled in wireless communication;

the head monitor and club monitor sensor devices each including an accelerometer, a processor, and a communication module;

the accelerometer in the club monitor sensor device configured to record a swing motion and, in response thereto, generate swing data corresponding to the swing motion;

the processor in the club monitor sensor device configured to process the swing data and determine an impact time in the swing motion;

the accelerometer in the head monitor sensor device configured to record head movement and, in response thereto, generate head data corresponding to the head movement;

the processor in the head monitor sensor device configured to, in response to the communication module in the head monitor sensor device receiving the impact time from the communication module in the club monitor sensor device, determine the head movement at the impact time from the head data; and the processor in the head monitor sensor device configured to issue an alert in response to the head movement around the impact time exceeding a threshold.

14. The system of claim 13, wherein the alert is an audible alert.

15. The system of claim 13, wherein the alert is a visual alert.

16. The system of claim 13, further comprising a high-pass filter in the accelerometer of the club monitor sensor device configured to remove slow-movement portions of the swing motion.

17. The system of claim 13, further comprising non-transitory memory in the head monitor sensor device for storing two seconds of head data.

18. The system of claim 13, further comprising the processor of the head monitor sensor device configured to issue the alert in response to the head movement exceeding the threshold within two seconds of the impact time.

19. The system of claim 18, wherein the accelerometer of the club monitor sensor device samples swing motion at a 100 hertz sampling rate.

20. The system of claim 13, wherein the accelerometer of the head monitor sensor device samples head movement at a 50 hertz sampling rate.

* * * * *